United States Patent [19]

Hosoya

[11] Patent Number: 5,051,853
[45] Date of Patent: Sep. 24, 1991

[54] MAGNETIC DISC DEVICE
[75] Inventor: Masachi Hosoya, Kanagawa, Japan
[73] Assignee: Nippon Seiko Kabushiki Kaisha, Tokyo, Japan
[21] Appl. No.: 344,070
[22] Filed: Apr. 26, 1989
[51] Int. Cl.$^5$ ............................................. G11B 17/28
[52] U.S. Cl. .............................. 360/99.08; 360/98.07; 360/99.04; 277/80
[58] Field of Search ............... 360/97.01, 99.04, 99.08, 360/98.07; 277/80

[56] References Cited

U.S. PATENT DOCUMENTS

| 4,531,846 | 7/1985 | Raj | 277/80 X |
| 4,604,222 | 8/1986 | Borduz et al. | 252/62.52 |
| 4,604,229 | 8/1986 | Raj et al. | 252/510 |
| 4,673,997 | 6/1987 | Gowda et al. | 360/107 |
| 4,692,826 | 9/1987 | Raj et al. | 360/99.08 X |
| 4,898,480 | 2/1990 | Raj et al. | 277/80 X |
| 4,905,110 | 2/1990 | Krum et al. | 360/99.08 |
| 4,973,064 | 11/1990 | Hosoya | 277/80 |

FOREIGN PATENT DOCUMENTS

| 60-76053 | 4/1985 | Japan . |
| 61-74972 | 4/1986 | Japan . |
| 62-98868 | 6/1987 | Japan . |
| 63-280403 | 11/1988 | Japan . |
| 916844 | 5/1979 | Sweden . |

Primary Examiner—John H. Wolff

[57] ABSTRACT

A magnetic disc device. A seal member consisting of ring magnet and ring-shaped pole pieces is built in a shaft or housing to which disc is fixed. The inner end of the seal member is fixed to the shaft side, and the outer end forms, between the housing, a gap in which electroconductive magnetic fluid is kept. The contact areas of the electroconductive magnetic fluid with the pole pieces and the housing are made remarkably large, so that not only grounding of the static electricity generated on the disc but also sealing of dust becomes effectual.

10 Claims, 4 Drawing Sheets

MAGNETIC DISC DEVICE

BACKGROUND OF THE INVENTION

1. Field of the Invention

This invention relates to a magnetic disc device which protects bearings with magnetic seal using a electroconductive magnetic fluid and at the same time grounds static electricity generated on the disc etc.

2. Description of the Prior Art

Heretofore, there have been available such devices as shown in FIGS. 7 and 8.

In the drawings, Numeral 1 is a cylindrical housing, Numeral 2 is a shaft disposed at the center of the housing 1 and supported with bearing 3. "C" is a ring-shape seal member which consists of a ring shape of magnet 6 and ring-shape pole pieces 4, 5 fixed to the end surfaces thereof. The seal member "C" is fixed to the inner surface of an outer race 3b of the bearing 3 with a gap "g" provided in between the pole pieces 4, 5 and an inner race 3a of the bearing 3. The inner race 3a is fixed to the shaft 2, and the outer race 3b to the housing 1. The housing 1 and the shaft 2 are electrically conductive, and the pole pieces 4, 5 are of magnetic material and also electroconductive. Numeral 7 are electroconductive magnetic fluids drawn to the above described gap "g" by magnetic force. The electroconductive magnetic fluids are maintained in place by magnetic field formed in between the inner race 3a and the seal member "C" by the magnet 6. Numeral 8 is a disc inserted onto the shaft 2, Numeral 9 a magnetic head, Numeral 10 bearing balls, Numeral 11 a ball cage, and Numeral 12 a seal plate.

The operation is as follows:

Because the gap "g" between the seal member "C" and the inner race 3a is sealed by the electroconductive magnetic fluids 7 held in between the both, the sealed gap can prevent dust (grease mist) from entering the inner clean zone from the bearing 3.

Further, because the pole pieces 4, 5 and the inner race 3a are made electroconductive through the electroconductive fluids 7, and the pole pieces 4, 5 and the outer race 3b are kept electroconductive through the electroconductive bond fixing the both, the shaft 2 is made electrically conductive to the housing 1. As a result, static electricity generated on the disc 8 is grounded through the shaft 2, the inner race 3a, the pole pieces 4, 5 and the housing 1.

But, since the resistance of the above-mentioned electroconductive magnetic fluid is extremely high, causing a poor conductivity, there have been a need for a less resistant system.

For this reason, the above-mentioned prior art made the axial thickness of the pole pieces 4, 5 as large as possible, to have large contact areas between the electroconductive magnetic fluid 7 and the pole pieces 4, 5 as well as the electroconductive magnetic fluid 7 and the inner race 3a.

Nevertheless, since the space in the bearing 3 is extremely limited, the space imposes a certain limit to the thickness of the pole pieces 4, 5, thus resulting in a failure to satisfy the above requirement. Therefore, the prior art could not succeed in an effectual grounding of static electricity generated on the disc.

Further, there has been available the U.S. Pat. No. 4,604,229 similar to the above-mentioned prior art.

This prior art (U.S. Pat. No. 4,604,229) has a construction in which a seal member similar to the seal member shown in FIGS. 7, 8 is directly inserted on the shaft at a position removed from the bearing, to obtain both of a static electric ground effect and a magnetic seal effect by electroconductive magnetic fluid magnetically held in a gap with the shaft.

Therefore, the U.S. Pat. No. 4,604,229 has a problem essentially similar to the above-mentioned precedent prior art.

Furthermore, there has been available the U.S. Pat. No. 4,673,997, the seal device using a electroconductive magnetic fluid similar to the prior art.

This prior art (U.S. Pat. No. 4,673,997) has another construction in which a space section accomodating a electroconductive magnetic fluid working as bearing is formed in between the shaft and the housing pivoting the shaft. In front and back of the space section, ring-shaped pole pieces of ring magnet are disposed to undergo magnetic force. In a gap between the inner end of the ring-shaped pole pieces and the periphery of the shaft, electroconductive magnetic fluid is thus magnetically maintained to be made magnetic seal.

As a result, electroconductive magnetic fluid magnetically held in between the shaft and the ring-shaped pole pieces can be a magnetic seal, and at the same time a sufficient amount of the fluid accomodated in the space section can be a good electroconductor for grounding. However, not only a great amount of precious electroconductive fluid filled in the space section increases the cost of the device, but also an extremely complicated construction of the space section to hold the electro magnetic fluid within the magnetic seal at both ends also increases the cost.

Further there have been available such devices using only magnetic fluid rather than the electroconductive magnetic fluid, as disclosed in the SU No. 916-844, Japan Laid-Open Patent No. 74972/1986, and Japan Utility Model Laid-Open Publn. No. 98868/1987.

The former, the Soviet Union Patent prior art has such a construction as follows: A ring magnet is fixed to the shaft. To the both sides of the magnet, two ring pole pieces are fixed, and magnetic fluid is magnetically held in between the peripheral end of the two ring pole pieces and the inside of the magnetized housing. The latter Japanese patent or publication is a magnetic seal device in which magnetic fluid is held in the housing through a magnet fixed to the shaft and through pole pieces to function as magnetic seal. In other words, in all the prior art, magnetic fluid is magnetically held not directly to the outer periphery of the shaft, but indirectly through pole pieces at a position outwardly removed from the peripheral surface of the shaft. As seen from the construction, they only aim at sealing and cannot expect such a sufficient electroconductivity as to ground static electricity generated.

Furthermore, there has been available such a device as disclosed in Japan Laid-Open Patent No. 76053/1985 in which: To keep magnetic fluid in sliding contact to the shaft, two pole pieces are fixed to each other across a ring magnet. The inner ends of the pole pieces are bent to opposite directions to each other so as to face each other, thus making magnetic field to keep magnetic fluid thereby.

The above prior art only maintains a gap around the outer periphery of the shaft and bends the inner ends of two pole pieces, in order only to keep magnetic fluid on the non-magnetic shaft. And yet the seal by means of the magnetic fluid employs only one stage of sealing, thus resulting in a failure to achieve a sufficient seal effect.

SUMMARY OF THE INVENTION

To solve the above-mentioned problems, a magnetic disc device according to the invention comprises:

a seal member consisting of two ring-shaped pole pieces fixed to the end surfaces of an axially polarized ring magnet;

a housing incorporating a shaft having bearings with rolling members therein to allow for a relative rotation of the shaft;

a disc which is fixed to above-mentioned shaft or the housing: and electroconductive magnetic fluid (such as disclosed in the Japan Laid-Open Patent No. 280403/1988 and the U.S. Pat. No. 4,604,222): wherein above-mentioned seal member is fixed to the shaft side, and above-mentioned electroconductive magnetic fluid is magnetically kept in a gap between the outer peripheral ends of two ring-shaped pole pieces of the aforementioned seal member and the housing side.

More particularly, the seal member is fixed to the inner race on the shaft side of the bearing, and the electroconductive magnetic fluid is magnetically maintained in a gap between the outer race on the housing side of the bearing and the outer peripheral edge of the two ring-shaped pole pieces on the seal member. Or alternatively the seal member is directly fixed to the shaft, and the electroconductive magnetic fluid is magnetically maintained directly in a gap between the housing and the outer peripheral edge of the two ring-shaped pole pieces on the seal member.

Further, a special combination of a seal member and a bearing a part of whose construction is changed to be disposed between the shaft and the housing helps increase the seal effect and the grounding effect.

In addition to the above, the outer peripheral edge of at least one pole of two ring-shaped pole pieces on the seal member, which magnetically maintain the electroconductive magnetic fluid in place is markedly enlarged as compared with the length of the above gap to have a large contact area with the electroconductive magnetic fluid kept in the gap, thus obtaining an increased seal effect and grounding effect.

This invention characterizes in that the contact resistance of static electricity between the inner peripheral side of the bearing and the outer peripheral side of the rotary shaft supported by the bearing becomes remarkably smaller than that of the prior art (FIG. 8), viz. characterizes in that this invention fixes the inner periphery of the ring shaped seal member through to the rotary shaft and forces the gap being capable to hold the magnetic fluid between the outer periphery of the seal member and the inner periphery side of the bearing. Accordingly, assuming that this invention and the citation have the same size of the bearing and the rotary shaft and also the same diameter of the pole pieces of both seal members, it is clear both gaps show that this invention forms bigger diameter but the citation does smaller diameter.

Thus, larger gap diameter of this invention than that of the prior art gives rise to larger magnetic fluid quantity to fill and hold in the gap of this invention than that of the prior art, which thus enables to enlarge the contact area with the bearing. The larger contact area of this invention than the citation enables resultingly to lessen the electrical resistance and to remarkably improve the electrical conductivity.

DESCRIPTION OF THE PREFERRED EMBODIMENTS

The first embodiment

Figure 1:
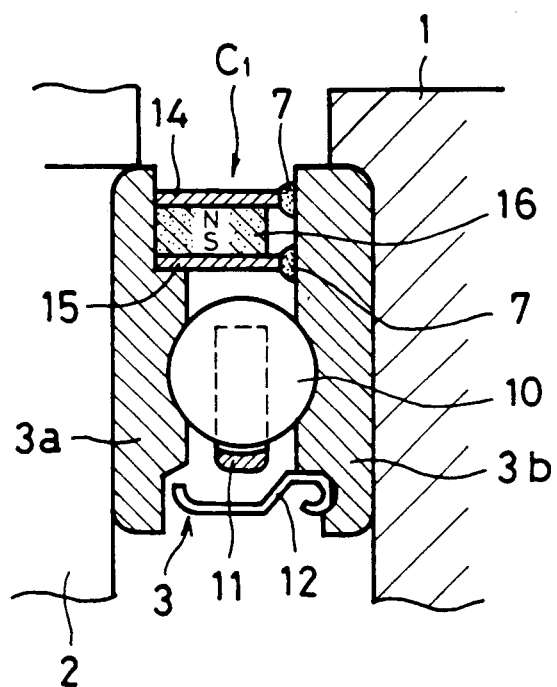
FIG. 1 is a sectional view showing major parts of the first embodiment according to the invention.
Figure 7:
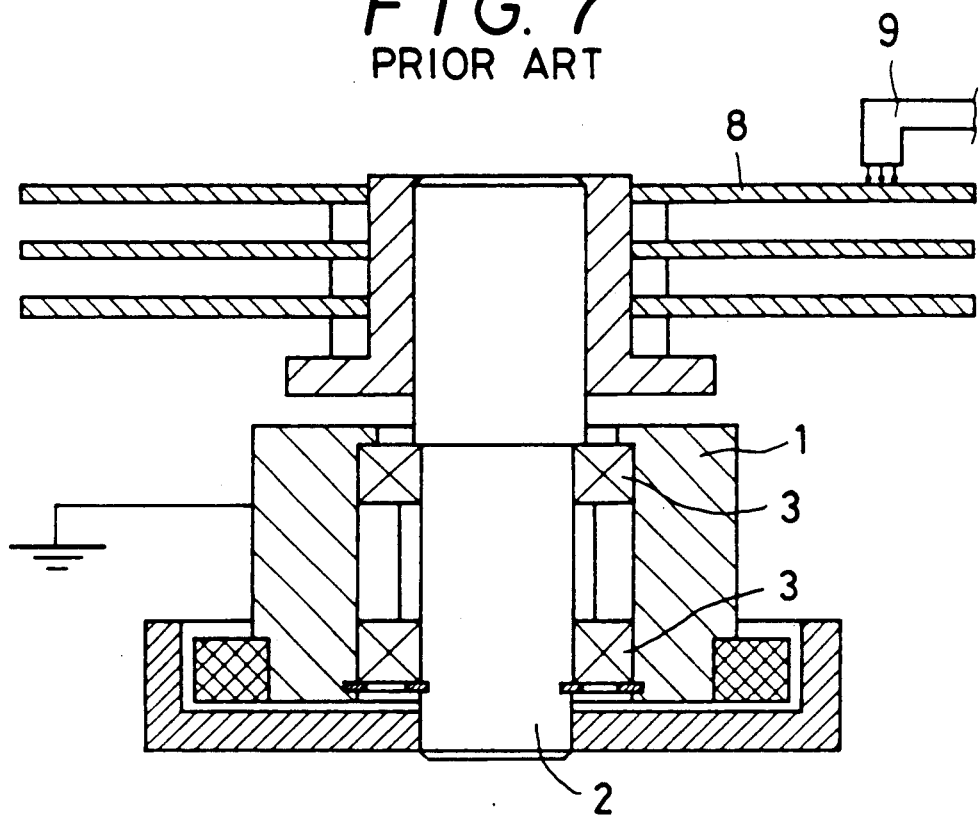
FIG. 7 is a sectional view showing a magnetic disc device according to the prior art.
Figure 8:
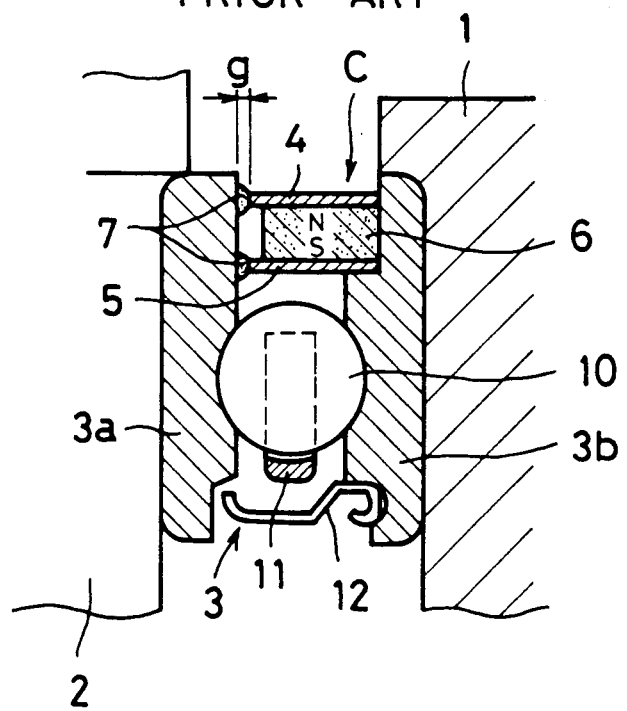
FIG. 8 is an enlarged sectional view showing the major parts of the magnetic disc device shown in FIG. 7.

FIG. 1 shows the first embodiment according to the invention, and gives the same numerals to parts same as or corresponding to the parts in FIGS. 7 and 8.

The embodiment shows the case where a ring-shaped seal member C1 is disposed in a bearing 3. The inner peripheral surface of the seal member C1 is fixed to the inner peripheral surface of an inner race 3a, a gap "g" is disposed in between the outer peripheral surface of ring-shaped pole pieces 14, 15 of the seal member C1 and the inner peripheral surface of an outer race 3b, and electroconductive magnetic fluid 7 is kept in the gap "g". In other words, the fluid 7 is sealed by the side of the outer race 3b.

Numeral 16 is a magnetic constituting the seal member C1. Other constituting components are the same as the ones of the prior art.

According to the construction, since electroconductive magnetic fluid 7 comes in contact with with the outer peripheral surface of the pole pieces 14, 15 and the inner peripheral surface of the outer race 3b, the contact area is made larger as compared with such case in the prior art as to contact with the inner peripheral surface of the inner race 3a and the inner peripheral surface of the pole pieces 4, 5. For this reason, the electric resistance of the electroconductive magnetic fluid 7 is reduced. As a result, the static electricity generated on the disc is effectually grounded.

FIG. 2 shows the second embodiment according to the invention. The second embodiment, as in the first embodiment, is so constructed as to seal the fluid on the side of the outer race 3b of the bearing 3, but they are different in the construction of the seal member from each other.

Figure 2A:
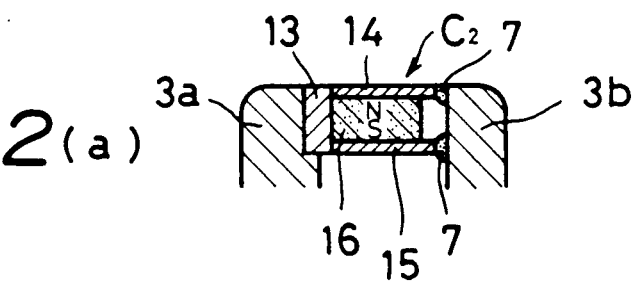
FIGS. 2 (a) to (b) are sectional view showing alternative seal members in the first embodiment.
Figure 2B:
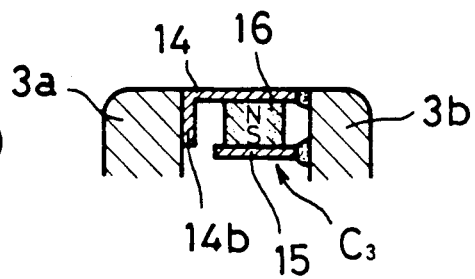

More particularly, a seal member C2 in FIG. 2(a) is similar to the seal member C1, but a sleeve 13 of f.g. electroconductive rubber is integrally put thereon. This is intended not only to assist in inserting the seal member onto the inner race 3a by way of the elastic property, but also to prevent the magnetic flux of the magnet 16 from leaking toward the side of the inner race 3a. (The sleeve itself may be aluminum, copper or other non-magnetic material) A seal member C3 in FIG. 2(b) is also similar to the seal member C1, but a bent extension 14b is provided to either pole piece 14. The operating effect is the same as the first embodiment.

The second embodiment

Figure 3:
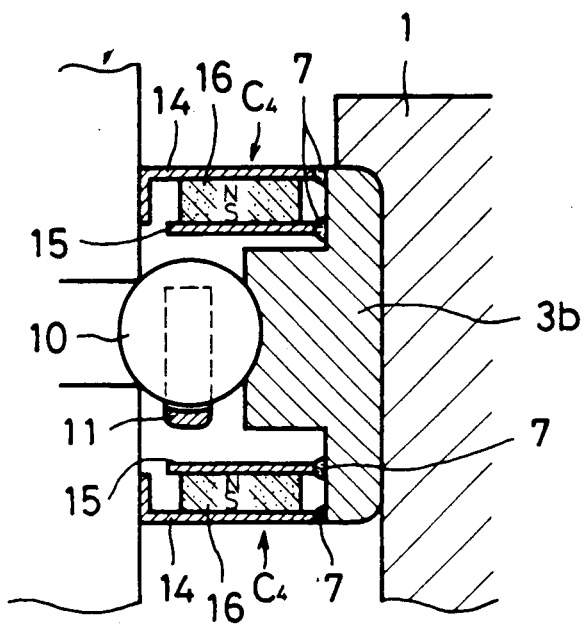
FIGS. 3 and 4 are the sectional views showing the major parts of the second embodiment.
Figure 4:
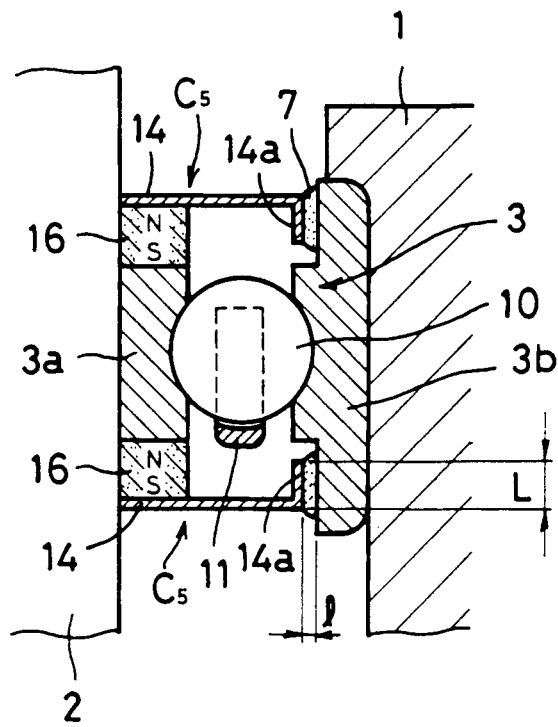

FIGS. 3 and 4 show the second embodiment.

In FIG. 3, a seal member C4 is fixed to a shaft 2 functioning as inner race of the bearing. And two pieces of the seal member C4 are fixed in parallel to the upper and lower sides of balls 10.

In FIG. 4, upper and lower peripheral portions of the inner race 3a are used as pole pieces, ring magnets 16 also are attached to both sides of the inner race 3a, and ring-shaped pole pieces 14 are fixed to the respective magnets 16 to make a seal member C5. Since FIGS. 3 and 4 make sealing by electroconductive magnetic fluid 7 on the side of the outer race 3b, the sealing effect is similar to the first embodiment.

The third embodiment

Figure 5:
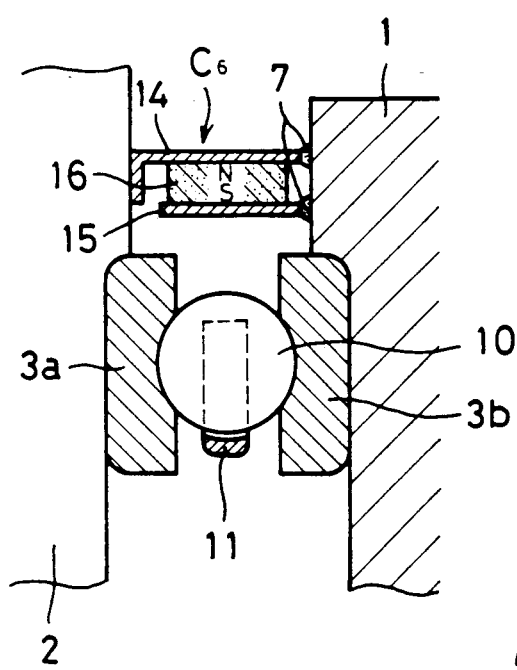
FIG. 5 is a sectional view showing the major parts of the third embodiment.

FIG. 5 shows the third embodiment.

The embodiment provides a seal member C6 at a place outside the bearing.

In other words, a seal member C6 is fixed to the shaft 2. A gap "g" is provided in between the pole pieces 14, 15 and a housing 1. Electroconductive magnetic fluid 7 is kept within the gap "g".

Note that the housing 1 in this embodiment is made of electroconductive magnetic material. The operation effect is similar to the first embodiment.

Figure 6A:
FIGS. 6 (a) to (c) are alternative seal members in the third embodiment.
Figure 6B:
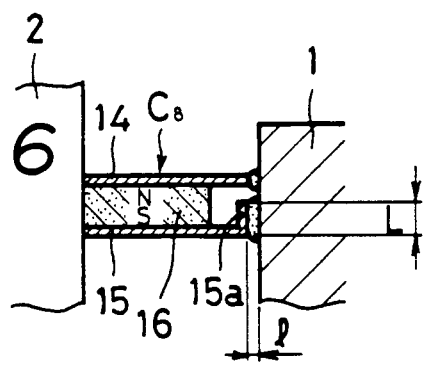
Figure 6C:
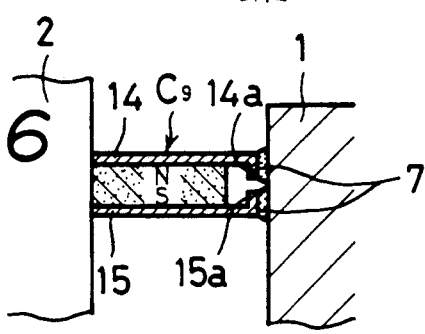

FIG. 6 shows alternatives to the seal member C6 in FIG. 5. A seal member C7 in FIG. 6(a) has a similar construction to the seal member C2 in FIG. 2(a). A seal member C8 in FIG. 6(b) has a cylindrical (bent) extension 15a at the outer peripheral portion of either one 15 of the pole pieces 14, 15 facing the housing 1, and a seal member C9 in FIG. 6(c) has bent extensions 14a, 15a at the outer peripheral portion of the both pole pieces 14, 15 facing the housing 1. Since the lengths L of these bent portions 14a, 15a are longer than the length l of the gap, the latter two seal members C8, C9 have larger contact areas of the electroconductive fluid 7 at the above bent portions 14a, 15a as compared to the ones of the seal members C1, C2, C3, C4, C6, C7 without the bent portions 14a, and 15a, thus leading to a substantial reduction in the resistance of the fluid 7. In this connection, the bent extension 14a of the seal member C5 in the embodiment in the above-mentioned FIG. 4 has the similar effect.

The first to third embodiments are magnetic disc devices in which the disc 8 is rotated by the rotating shaft 2 to which the disc 8 is connected, but the housing rather than the shaft can be rotated with the disc connected to the housing to roatate the disc.

As described above, according to the invention, keeping the electroconductive magnetic fluid in the gap between the pole pieces and the outer race or the housing makes a larger contact area of the fluid with pole pieces and the outer race or the housing, thereby causing fluid resistance to be much less, leading to an effectual grounding of static electricity generated on the disc.

I claim:

1. A magnetic disc device comprising:
   a seal member consisting of two ring-shaped pole pieces fixed to the end surfaces of an axially polarized ring magnet;
   a housing incorporating a shaft having bearings with rolling members therein to allow for a relative rotation of the shaft;
   a disc fixed to said shaft or said housing; and
   electroconductive magnetic fluid;
   wherein inner peripheral ends of the ring-shaped pole pieces of said seal member is fixed to the shaft side, and said electroconductive magnetic fluid is magnetically kept in a gap between outer peripheral ends of the ring-shaped pole pieces of said seal member and said housing.

2. A magnetic disc device as claimed in claim 1, wherein
   said seal member consisting of two ring-shaped pole pieces fixed to the end surfaces of an axially polarized ring magnet is fixed to the inner race on the shaft side of the
   bearing, and electroconductive magnetic fluid is magnetically kept in a gap between the outer race on the housing side of the bearing and the outer peripheral ends of the two ring-shaped pole pieces of said seal member.

3. A magnetic device as claimed in claim 2 wherein
   bent extensions are formed on outer peripheral ends of the pole pieces in the seal member to form the gap, and
   the length of said bent extensions is made larger than the distance of the gap to have a larger contact area of the pole pieces with electroconductive magnetic fluid.

4. A magnetic disc device as claimed in claim 1, wherein
   said seal member consisting of two ring-shaped pole pieces fixed to the end surfaces of an axially polarized ring magnet is fixed directly to the shaft, and
   electroconductive magnetic fluid is magnetically kept in a gap between the housing itself and the outer peripheral ends of the two ring pole pieces in said seal member.

5. A magnetic device as claimed in claim 4 wherein
   bent extensions are formed on outer peripheral ends of the pole pieces in the seal member to form the gap, and
   the length of said bent extensions is made larger than the distance of the gap to have a larger contact area of the pole pieces with electroconductive magnetic fluid.

6. A magnetic disc device as claimed in claim 3, wherein
   said seal member consisting of two ring-shaped pole pieces fixed to the end surfaces of an axially polarized ring magnet is disposed in the bearing which has no inner race but an outer race.

7. A magnetic device as claimed in claim 6 wherein
   bent extensions are formed on outer peripheral ends of the pole pieces in the seal member to form the gap, and
   the length of said bent extensions is made larger than the distance of the gap to have a larger contact area of the pole pieces with electroconductive magnetic fluid.

8. A magnetic disc device as claimed in claim 3, wherein
   the inner race of the bearing is used as pole pieces,
   the ring magnets are disposed at both ends of said pole pieces, and
   the ring magnets are disposed at both ends of said pole pieces, and electroconductive magnetic fluid is magnetically kept in a gap between the outer race of the bearing and the outer peripheral ends of the two ring-shaped pole pieces fixed to the magnetic poles at the end face portions of said magnets.

9. A magnetic device as claimed in claim 8 wherein bent extensions are formed on outer peripheral ends of the pole pieces in the seal member to form the gap, and the length of said bent extensions is made larger than the distance of the gap to have a larger contact area of the pole pieces with electroconductive magnetic fluid.

10. A magnetic disc device as claimed in claim 1, wherein bent extensions are formed on outer peripheral ends of the pole pieces in the seal member to form the gap, and the length of said bent extensions is made larger than the distance of the gap to have a larger contact area of the pole pieces with electroconductive magnetic fluid.

* * * * *